United States Patent
Stampe

(10) Patent No.: US 10,141,806 B2
(45) Date of Patent: Nov. 27, 2018

(54) STATOR ARRANGEMENT

(71) Applicant: GRUNDFOS HOLDING, Bjerringbro (DK)

(72) Inventor: Lars Toft Stampe, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 529 days.

(21) Appl. No.: 14/409,622

(22) PCT Filed: May 27, 2013

(86) PCT No.: PCT/EP2013/060873
§ 371 (c)(1),
(2) Date: Dec. 19, 2014

(87) PCT Pub. No.: WO2013/189696
PCT Pub. Date: Dec. 27, 2013

(65) Prior Publication Data
US 2015/0244231 A1    Aug. 27, 2015

(30) Foreign Application Priority Data
Jun. 21, 2012 (EP) .................................. 12172968

(51) Int. Cl.
*H02K 3/38*   (2006.01)
*H02K 3/52*   (2006.01)
(Continued)

(52) U.S. Cl.
CPC ........... *H02K 3/38* (2013.01); *F04D 13/0626* (2013.01); *F04D 29/181* (2013.01); *F04D 29/20* (2013.01);
(Continued)

(58) Field of Classification Search
CPC ............ H02K 3/38; H02K 3/30; H02K 3/325; H02K 3/345; H02K 3/522; H02K 2203/06; F04D 13/0626; F04D 29/181; F04D 29/20
(Continued)

(56) References Cited

U.S. PATENT DOCUMENTS

2004/0070293 A1* 4/2004 Kabasawa ............... H02K 3/522
                                                          310/71
2006/0175926 A1* 8/2006 Best ..................... H02K 5/1735
                                                          310/179
(Continued)

FOREIGN PATENT DOCUMENTS

CN        1839528 A     9/2006
CN        1860660 A     11/2006
(Continued)

OTHER PUBLICATIONS

Chinese Office Action dated May 30, 2016.

*Primary Examiner* — Michael Andrews
(74) *Attorney, Agent, or Firm* — McGlew and Tuttle, P.C.

(57) ABSTRACT

A stator arrangement for an electrical motor has several windings (28) which are arranged on a winding carrier (26) of plastic. A groove (32) extends in the peripheral direction and is open to the axial end-side and in which at least one electrical conductor (30) electrically connecting two of the windings (28) is arranged. The groove (32) is formed on at least one axial end-side (20) of the winding carrier (26). An electric motor including the stator arrangement as a pump assembly with such a stator arrangement are also provided.

20 Claims, 3 Drawing Sheets

(51) Int. Cl.
*F04D 13/06* (2006.01)
*F04D 29/18* (2006.01)
*F04D 29/20* (2006.01)
*H02K 3/30* (2006.01)
*H02K 3/32* (2006.01)
*H02K 3/34* (2006.01)

(52) U.S. Cl.
CPC ............... *H02K 3/30* (2013.01); *H02K 3/325* (2013.01); *H02K 3/345* (2013.01); *H02K 3/522* (2013.01); *H02K 2203/06* (2013.01)

(58) Field of Classification Search
USPC ...................... 310/156.29, 208, 195, 179, 71
See application file for complete search history.

(56) References Cited

U.S. PATENT DOCUMENTS

| | | | |
|---|---|---|---|
| 2007/0182265 A1 | 8/2007 | Making et al. | |
| 2007/0232094 A1* | 10/2007 | Hoshika | H02K 3/522 |
| | | | 439/76.2 |
| 2009/0102307 A1 | 4/2009 | Amano | |
| 2011/0084562 A1* | 4/2011 | Shinohara | H02K 3/522 |
| | | | 310/71 |

FOREIGN PATENT DOCUMENTS

| | | | | |
|---|---|---|---|---|
| CN | 101047327 A | | 10/2007 | |
| JP | WO 2011108735 A1 * | | 9/2011 | ............. H02K 3/522 |
| WO | 2005/020408 A2 | | 3/2005 | |
| WO | 2011/108735 A1 | | 9/2011 | |

\* cited by examiner

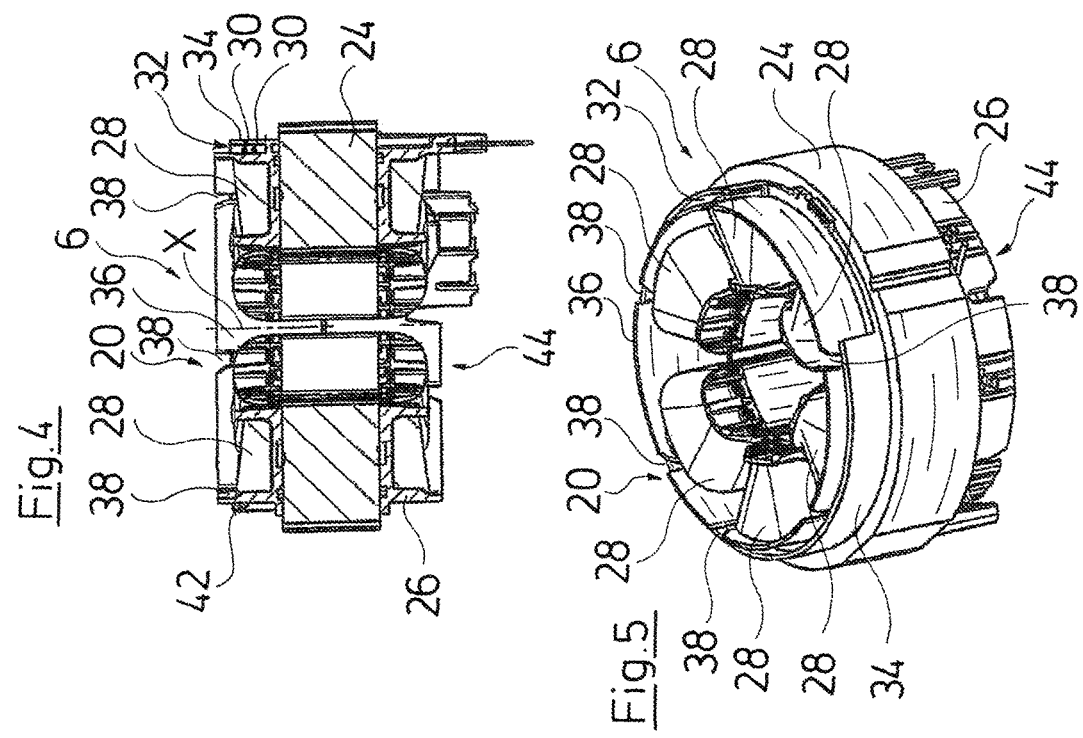

STATOR ARRANGEMENT

CROSS REFERENCE TO RELATED APPLICATIONS

This application is a United States National Phase Application of International Application PCT/EP2013/060873 filed May 27, 2013 and claims the benefit of priority under 35 U.S.C. § 119 of European Patent Application EP 12172968.5 filed Jun. 21, 2012, the entire contents of which are incorporated herein by reference.

FIELD OF THE INVENTION

The invention relates to a stator arrangement for an electric motor, as well as to an electric motor with such a stator arrangement and to a pump assembly with such an electric motor.

BACKGROUND OF THE INVENTION

For example, in pump assemblies which have an electric drive motor, a stator arrangement with which several stator windings are arranged on a common winding carrier, is provided in this motor. The stator windings as a rule are thereby electrically connected to one another in pairs. Connection wires are to be arranged on the winding carrier for this. As a rule, diametrically oppositely lying coils are connected in series, so that the connection wires are to be led over half the periphery. Such stator arrangements are thereby often arranged in metallic stator housings. For this reason, it is important to adequately electrically insulate the connection wires of the coils which lie on the winding carrier at the outside or to maintain adequate distances to the inner wall of the metallic stator housing. This is particularly difficult with compactly constructed pump assemblies.

SUMMARY OF THE INVENTION

With regard to this problem, it is an object of the invention to provide an improved stator arrangement which with a compact construction permits a simple electrical insulation of connection wires between the individual windings, with respect to the surrounding metal parts.

The stator arrangement according to the invention is provided for use in an electric motor and comprises several electrical windings which in the known manner can be wound from a coated copper wire. The windings are arranged on a winding carrier of plastic, in particular on a common winding carrier of plastic. This winding carrier is preferably designed as one part or in a single-piece manner, but can however also be composed of several individual parts. The winding carrier serves for fixing the windings and preferably also for the electrical insulation of the windings with respect to the metallic components of the stator, in particular to the iron laminations arranged in the stator.

According to the invention, at least one groove is formed on the winding carrier on at least one axial end-side of the winding carrier. This groove extends in the peripheral direction and is opened to the axial end-side. At least one electrical conductor is arranged in the groove and this connects two of the windings, in particularly two diametrically oppositely lying windings, to one another. An adequate electrical insulation with respect to a surrounding stator housing or surrounding metal parts, in particular to the radial side, can be ensured by way of the arrangement of this electric conductor in the groove, since the conductor on the outer periphery can be covered by a side-wall of the groove and thus kept at a distance to a surrounding component. I.e. the side-wall of the groove, seen in the radial direction, lies between the electrical conductor and the inner wall of the stator housing or a surrounding metal part, when the stator arrangement is inserted into stator housing. Since the winding carrier is designed of plastic, such a side-wall of the groove can provide an adequate electrical insulation, even if it is simultaneously designed very thinly in the radial direction, so that as a whole a very small distance of the electrical conductor to the inner wall of the stator housing is possible, despite there being a good electrical insulation. A compact construction of the motor is ensured by way of this. Simultaneously, one can make do without an additional insulation of the electric conductor and preferably the lacquered (enameled) winding wire, from which the windings are formed, can simply be led through the groove for the connection of the two windings.

Preferably, the at least one groove has such a depth in the axial direction, that the electrical conductor on the outer periphery of the stator arrangement is completely covered by a side-wall of the groove. Thus it is ensured that the side-wall of the groove which is designed of plastic as is the case with the remaining winding carrier, securely separates the electric conductor from a surrounding stator housing and electrically insulates it.

Further preferably, several pairs of windings are provided, whose two windings are connected to one another in each case via an electrical conductor which is arranged in the at least one groove. Thereby, several grooves can be envisaged, so that each electrical conductor is led in its own groove. However, it is also possible for the groove to comprise at least one section, in which several electrical conductors are arranged. In this case, the electrical conductors preferably have an insulation such as a common lacquering. The pairs of windings in the known manner are preferably arranged such that their two windings are arranged in each case lying diametrically opposite on the stator. I.e., the conductor which connects the windings must extend essentially over 180° of the periphery of the stator arrangement or of the winding carrier. If several electrical conductors are arranged together in a groove or a section of the groove, the several electrical conductors are preferably arranged lying axially over one another in this at least one section of the groove. Thus, the radial width of the groove can be kept low.

According to a further preferred embodiment, projections for holding or guiding the at least one electrical conductor can be formed in the groove. By way of these projections, one can ensure that the conductor does not inadvertently slip out of the groove. If several conductors are arranged in a common section of the groove, the projections can further serve for positioning individual conductors relative to one another in the desired manner.

The groove moreover preferably comprises sections of a different depth in the axial direction. Thus, for example, the sections of the groove, in which several conductors are led, can be designed deeper seen in the axial direction, than sections, in which for example only one conductor is led. Thus, an optimal leading or guiding also of several conductors is achieved, without these projecting beyond the upper edge of the groove in the axial direction or inadvertently being able to slip out of this.

Usefully, the at least one groove on its radially inner lying wall comprises openings, in particular slots, through which the at least one electrical conductor extends from the windings into the groove. I.e., preferably an opening or slot lies at the peripheral position of each winding in the groove, so that the electrical conductor can be led from this winding through the slot into the groove. The slots preferably lie on the radially inner lying wall of the groove, so that the winding wires or electrical conductors can be led from the radial inner side into the groove, and the radial outer side of the groove can be designed in a closed manner, so that there the radially outer side-wall of the groove shields or covers the electrical conductor, and the electrical conductor in this region cannot come into contact with the surrounding components.

In the case that the grooves comprise sections of different depth in the axial direction, the steps or transitions between the sections of a different depth are preferably situated at the angular positions of the openings. The steps thereby do not need to be designed at right angles, but can also be designed as oblique, inclined or rounded transitions. The arrangement of the steps at the positions of the openings has the advantage that the depth of the grooves changes exactly where the electric conductors are led in the groove. Thus, for example, the groove can have a greater depth precisely where an additional conductor is led into the section of the groove. Thus, an optimal leading of the electrical conductors in the groove is achieved.

According to a further preferred embodiment, the groove has a radially inner lying wall which in the axial direction has a greater height than a radially outer lying wall of the groove. I.e., the radially inner lying wall of the groove projects in the axial direction beyond the radially outer-lying wall or side-wall of the groove in the axial direction. This has the advantage that on introducing the electric conductors into the groove, these can be led along the inner wall, i.e. be applied or wound around the inner wall. This favors an automated assembly of the conductors in the groove, since the wire or conductor can be led very simply around the inner wall in the groove with the help of a gripper or needle.

The groove does not need to extend over the whole periphery of the stator arrangement or of the winding carrier. Rather, according to a preferred embodiment, the groove can extend only over a limited peripheral section of less than 360°, preferably less or equal to 320°. If, for example, six windings are provided, these are usually distanced in each case by 60° from one another in the peripheral direction. If, of these six windings, in each case two windings are connected by an electrical conductor into a winding pair, thus three conductors are necessary for the connection of the windings. These are preferably arranged in a groove and all extend on the same peripheral side or in the same peripheral direction around the winding carrier. Thus, no conductor runs on the winding carrier between the last two adjacent windings, so that also no groove is required at this location over an angle of about 45° to 60°.

As already mentioned above, the at least one electric conductor is preferably formed by a lacquered winding wire. No further insulation is necessary due to the arrangement in the groove. In particular, an adequate additional insulation with respect to the surrounding metal part is ensured alone by the outer side-wall of the groove which is formed from plastic as the winding carrier.

The at least one groove is preferably situated at a first axial end-side of the winding carrier, and an electrical connection, in particular an electrical connection plug for the electrical connection of the stator arrangement, is situated on the winding carrier at an opposite second axial end-side. I.e., of the windings, in each case one end is led at the first end-side of the winding carrier into the groove, in order in each case to connect two winding in a paired manner and in series with one another. The second end of the windings is led at the second axial end-side to an electrical connection, in particular to the electrical connection plug, in order for example to electrically connect the stator arrangement to an electronics housing or terminal box.

The winding carrier encloses preferably an arrangement of stator laminations, in particular in iron laminations. Thereby, the winding carrier of plastic preferably forms an electrical insulation between the winding wire and stator laminations. The arrangement of stator laminations is further preferably cast into the winding carrier.

The subject-matter of the invention is further an electric motor which comprises a stator arrangement according to the preceding description. The motor can have all features described previously in the context of the stator arrangement. Preferably, the electric motor has a metallic stator housing, in which the previously described stator arrangement is arranged. As described, the groove thereby ensures that the connection wires or electrical conductors which connect the windings to one another are kept at a distance to the inner wall of the metallic stator housing or are additionally electrically insulated with respect to the inner wall of the stator housing, by way of the side-wall of the groove.

Moreover, a pump assembly, in particular a circulation pump assembly is the subject matter of the invention. Such a pump assembly has an electrical motor as has been previously described and thus a stator arrangement according to the previous description. The pump assembly can thus also have all features which have been previously described in the context of the electrical motor and the stator arrangement. Particularly preferably, the electrical motor is a wet-running electric motor which comprises a can or canned pot between the stator and a rotor rotatably arranged in the stator. Such a circulation pump can for example be a heating circulation pump assembly or a submersible pump assembly.

Further preferably, the electric motor is designed as a wet-running motor, and the winding carrier at its first axial end is surrounded in the region of the previously described groove by a collar of a metallic can. This collar of the metallic can may come to sealing bear on a surrounding pump housing and/or stator housing. With this embodiment, the groove has the further advantage that the outer side-wall or the peripheral wall of the groove forms an insulation with respect to the surrounding metallic collar of the can. The metallic collar of the can may thus be arranged very close to the region, in which the electrical conductors are led. An electrical insulation is ensured in any case by way of the side-wall of the groove.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a sectioned view of the stator housing according to FIG. 2;

FIG. 4 is a sectioned view of the stator arrangement of a view rotated by 90°; and FIG. 5 is a further perspective view of the stator arrangement according to the invention.

DESCRIPTION OF THE PREFERRED EMBODIMENTS

Figure 1:
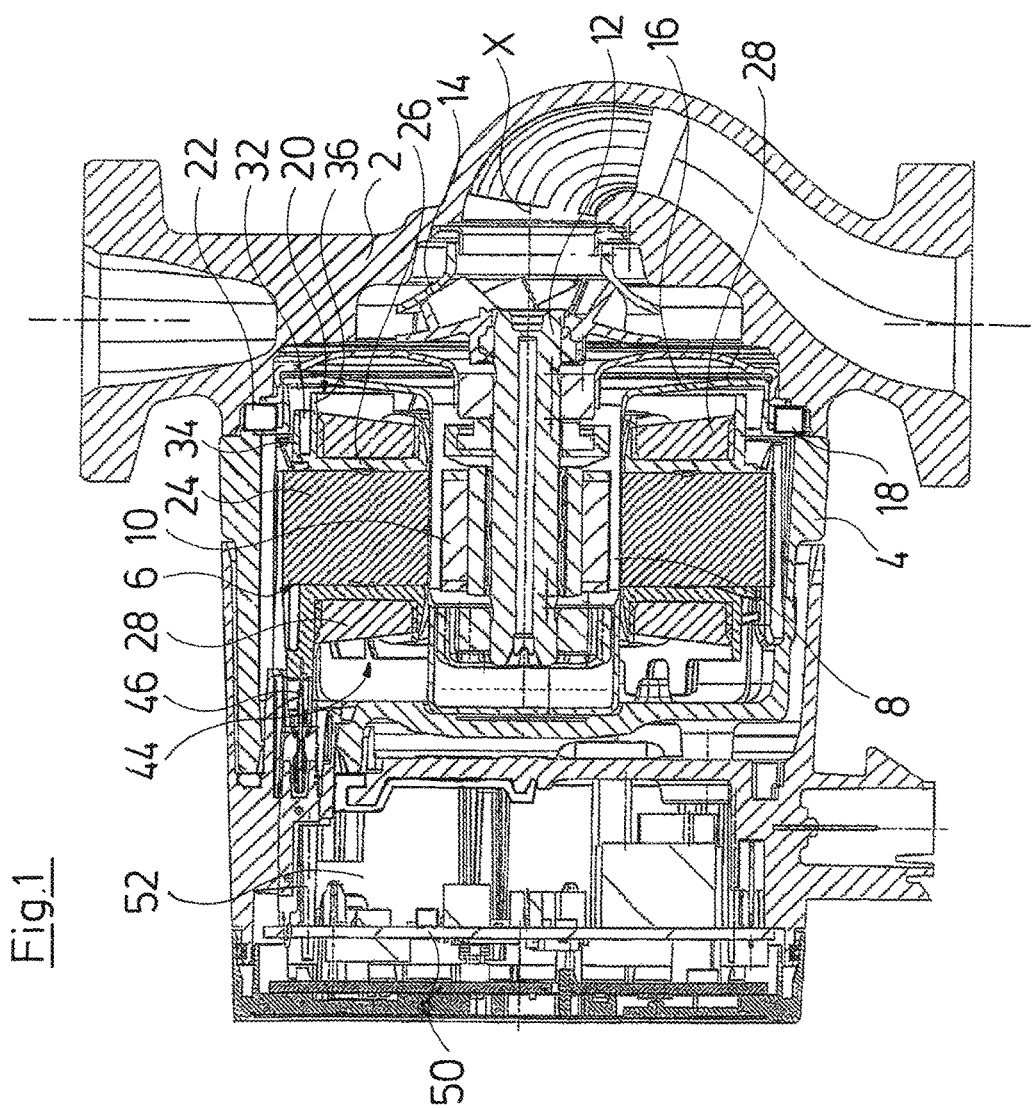
FIG. 1 is a sectioned view of a pump assembly with a stator arrangement according to the invention.

FIG. 1 shows a pump assembly consisting of a pump housing 2 and of a stator housing 4 which is applied axially, i.e. in the direction of the rotation axis X. The electric drive motor of the pump assembly is arranged in the inside of the stator housing 4. This comprises a stator arrangement 6 which surrounds a canned pot 8. I.e., the electric motor is designed as a wet-running electric motor. A rotor 10 is arranged in the inside of the canned pot 8 and is connected via the rotor shaft 12 to an impeller 14 in the inside of the pump housing 2. The can or the canned pot 8 at its open end facing the pump housing 2 has a radially outwardly directed collar 16 which is axially angled at its radially outer end. This axial angulation or bending 18 extends from the collar 16 to the side which is away from the pump housing 2, in the axial direction. The axial bending 18 thereby surrounds the stator arrangement at its first axial end-side 20 which faces the pump housing 2. The canned pot 8 via the collar 16 and the axial bending 18 bears tightly on a seal 22 which is arranged between the pump housing 2 and the stator housing 4. The interior of the canned pot 8 is sealed to the outside at the interface to the pump housing 2, by way of the seal 22.

The stator arrangement 6 has an arrangement of stator laminations 24 which are cast from plastic into a winding carrier 26. Six windings 28 are arranged on the winding carrier 26. Of the windings 28, in each case two diametrically oppositely lying windings as a winding pair are electrically connected in series with one another. For this, the winding wire between the two windings 28 of a winding pair is led at the first end-side 20 of the winding carrier 26 from a peripheral side to the diametrically oppositely lying peripheral side. For leading the winding wires 30, a groove 32 extending in the peripheral direction is formed on the first end-side 20 of the winding carrier 26. The groove 32 does not extend over the whole periphery, but about 300° over the periphery, as is to be seen in FIG. 5. The groove 32 is delimited by a radially outer side-wall 34 which is not shown in the representation in FIG. 2, in order to render the inside of the groove 32 recognizable. The radially outer side-wall 34 of the groove 32 has such an axial length or height in the direction of the longitudinal axis X, that on the outer periphery it completely covers the electrical conductors or winding wires 30 in the inside of the groove 32. Thus, the outer side-wall 34 of the groove 32 forms an electrical insulation, in particular with respect to the axial bending 18 of the collar 16 of the canned pot 8, the surrounding pump housing 2 as well as the surrounding stator housing 4. One can make do without an additional insulation due to the arrangement of the winding wires 30 in the groove 32. Instead, winding wires with lacquered coatings which are used for the windings 28, can be led directly in the groove 32. Moreover, the axial bending 18 of the canned pot 8 or also the stator housing 4 can be brought very close to the stator housing 6 in the radial direction, wherein a secure insulation of the conductors or of the winding wires 30 which connect the individual windings 28 to one another, is given by the side-wall 30.

The groove 32 on the inner periphery is delimited by an inner side-wall 36. The inner side-wall 36 has a greater axial length in the direction of the longitudinal axis X than the outer side-wall 34. This has the advantage that the winding wires 30 on incorporation into the groove 32 can be wound very simply around the inner side-wall 36 and be led on this.

Openings in the form of slots 38 are formed in the inner side-wall 36, through which slots the winding wires 30 are led from the windings 28 into the inside of the groove 32. For this, the slots 38 are each arranged at the angular positions of the windings 38.

Figure 2:
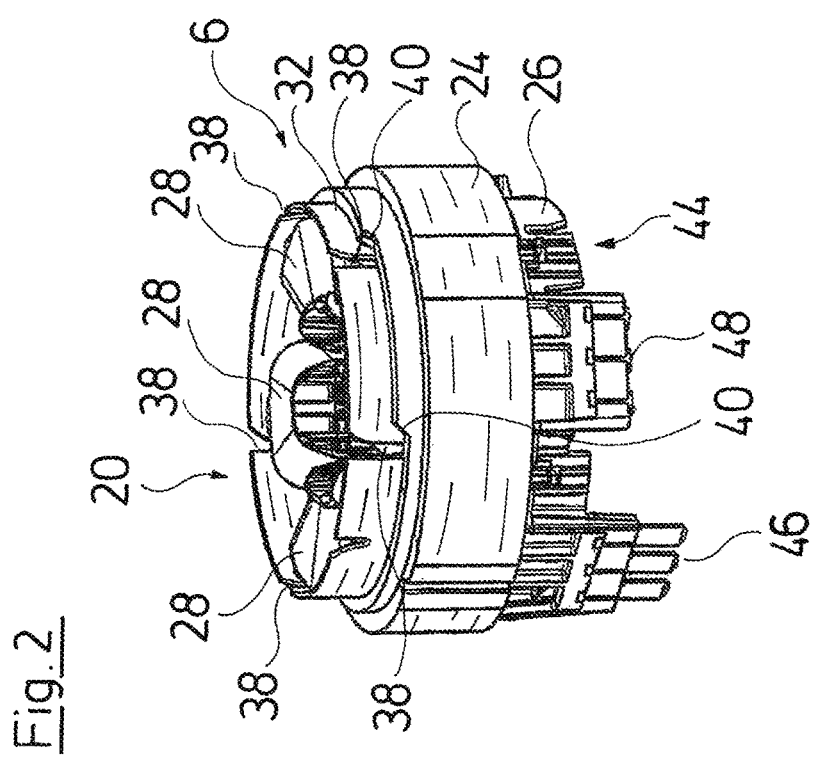
FIG. 2 is a perspective view of a stator arrangement according to the invention, as is used in the pump assembly according to FIG. 1.

The groove 32 comprises sections of different axial depths, depending on whether the respective sections have to receive one, two or three winding wires 30. For this, the base of the groove 32, as is shown in FIG. 2, is designed in a stepped manner. The regions, in which three winding wires are led, have the greatest axial depth. The region, in which only one winding wire is led, has the lowest depth. The steps 40 at which the depth of the groove 32 changes, are situated at the angular positions of the slots 38. Thus, the depth of the groove 32 changes where an additional winding wire 30 is led into the groove 32 through a slot 38. I.e., there, the groove 32 is deeper in the axial direction. Thus, the winding wires 30 are led in the groove 32 in a manner lying axially above one another.

Additional projections 42 can be formed on the side-walls 34 and 36 which prevent the winding wire 30 from slipping out of the groove 32 in the axial direction, for guiding or fixing winding wires 30 on or in the groove 32. Moreover, the individual winding wires 30 can also be led distanced to one another by way of such projections.

The electrical connection in each case of two windings 28 into a winding pair is effected in the described manner at the first axial end-side 20 of the stator arrangement which faces the pump housing 2 and the collar 16 of the canned pot 8. The coils 28 are electrically contacted at the opposite, second end-side 44. For this, a connection plug 46 is provided, which in this example comprises three poles, since three winding pairs are present here. Each winding pair is connected with a first connection or conductor end to one of the poles of the connection plug 46. The second connection of each winding pair is connected in a contact strip 48 to a star point. I.e., here the windings are arranged in a star circuit. The windings are electrically connected via the connection plug 46 to the electronics 50 in a terminal box 52 connected to the stator housing 4.

While specific embodiments of the invention have been shown and described in detail to illustrate the application of the principles of the invention, it will be understood that the invention may be embodied otherwise without departing from such principles.

The invention claimed is:

1. An electric motor comprising a stator arrangement, the stator arrangement comprising:
   windings;
   a winding carrier formed of plastic, the windings being arranged on the winding carrier, wherein at least one groove, which extends in the peripheral direction, is open to an axial end-side and is formed on at least one axial end-side of the winding carrier, the winding carrier extending in a circumferential direction with respect to a longitudinal axis of the stator arrangement; and
   at least one electrical conductor electrically connecting two of the windings, the at least one electrical conductor being arranged in the at least one groove, the at least one electrical conductor being formed by a lacquered winding wire, the at least one groove being situated at a first axial end-side of the winding carrier, and an electrical connection plug for the electrical connection of the stator arrangement being situated at an opposite, second axial end-side of the winding carrier, the electrical connection plug extending in an axial direction with respect to the longitudinal axis of the stator arrangement, wherein at least a portion of the connection plug is located adjacent to a terminal box.

2. An electric motor according to claim 1, wherein the stator arrangement is arranged in a metallic stator housing.

3. An electric motor according to claim 1, wherein the first axial end-side of the winding carrier is located at a first distance from a pump housing, the plug being arranged at a second distance from the pump housing, the first distance being less than the second distance.

4. An electric motor according to claim 1, wherein the at least one electrical connector is integrally connected to the two of the windings.

5. An electric motor according to claim 1, further comprising:
a stator housing, the stator housing being connected to a pump assembly, the pump assembly comprising a pump housing and the terminal box, the pump housing comprising a pump housing interior space, the terminal box comprising a terminal box interior space, the terminal box being connected to the stator housing, wherein the plug extends in a direction of the terminal box and the electronic component, at least a portion of the electrical connection plug being located in the terminal box interior space, at least a portion of the first axial end-side of the winding carrier being located in the pump housing interior space.

6. An electric motor in accordance with claim 1, wherein at least a portion of the winding carrier is located in an area of a stator housing, the stator housing being connected a pump housing.

7. A circulation pump assembly comprising:
a terminal box comprising a plug receiving portion;
an electrical motor, wherein the electrical motor comprises:
windings;
a winding carrier formed of plastic, the windings being arranged on the winding carrier, wherein at least one groove, which extends in the peripheral direction, is open to an axial end-side and is formed on at least one axial end-side of the winding carrier, the winding carrier extending in a circumferential direction with respect to a longitudinal axis of the stator arrangement; and
at least one electrical conductor electrically connecting two of the windings, the at least one electrical conductor being arranged in the at least one groove, the at least one electrical conductor being formed by a lacquered winding wire, the at least one groove being situated at a first axial end-side of the winding carrier, and an electrical connection plug for the electrical connection of the stator arrangement being situated at an opposite, second axial end-side of the winding carrier, the electrical connection plug extending in an axial direction with respect to the longitudinal axis of the stator arrangement, wherein the connection plug is inserted in the axial direction into the plug receiving portion of the terminal box.

8. A pump assembly according to claim 7, wherein the electrical motor is designed as a wet-running motor and further comprises a metallic can, and the winding carrier in the region of the groove is surrounded by a collar of the metallic can.

9. A circulation pump assembly in accordance with claim 7, further comprising:
a pump housing;
a stator housing connected to the pump housing and the terminal box, at least a portion of the first axial end-side of the winding carrier being arranged in an area of the pump housing, at least a portion of the winding carrier being arranged in the stator housing, at least a portion of the electrical connection plug being located adjacent to the terminal box.

10. An electric motor assembly, comprising:
a terminal box comprising electronics; and
an electrical motor, wherein the electrical motor comprises:
windings;
a winding carrier formed of plastic, the windings being arranged on the winding carrier, wherein at least one groove, which extends in the peripheral direction, is open to an axial end-side and is formed on at least one axial end-side of the winding carrier, the winding carrier extending in a circumferential direction with respect to a longitudinal axis of the stator arrangement;
at least one electrical conductor electrically connecting two of the windings, the at least one electrical conductor being arranged in the at least one groove, the at least one electrical conductor being formed by a lacquered winding wire, the at least one groove being situated at a first axial end-side of the winding carrier, and an electrical connection plug for the electrical connection of the stator arrangement being situated at an opposite, second axial end-side of the winding carrier, the electrical connection plug extending in an axial direction with respect to the longitudinal axis of the stator arrangement, the windings being electrically connected to the electronics via at least the electrical connection plug.

11. An electric motor assembly in accordance with claim 10, wherein the terminal box comprises a plug receiving portion, wherein the connection plug is inserted in the axial direction into the plug receiving portion.

12. An electric motor assembly according to claim 10, further comprising:
a stator housing, the stator housing being connected to a pump assembly, the terminal box comprising a terminal box interior space, the terminal box being connected to the stator housing, wherein the plug extends in a direction of the terminal box and the electronics, at least a portion of the electrical connection plug being located in the terminal box interior space.

13. An electric motor assembly in accordance with claim 10, further comprising:
a pump housing;
a stator housing connected to the pump housing and the terminal box, at least a portion of the first axial end-side of the winding carrier being located in an area of the pump housing, at least a portion of the winding carrier being arranged in an area of the stator housing, at least a portion of the electrical connection plug being located adjacent to the terminal box.

14. An electric motor assembly in accordance with claim 10, further comprising:
   a pump housing;
   a stator housing connected to the pump housing and the terminal box, at least a portion of the electrical connection plug being arranged between the stator housing and the electronics.

15. An electric motor assembly in accordance with claim 10, wherein the electrical motor comprises a stator, the winding carrier being arranged in an area of the stator.

16. An electric motor assembly in accordance with claim 10, wherein the at least one groove comprises sections of a different depth in the axial direction.

17. An electric motor assembly in accordance with claim 10, wherein the at least one groove at its radially inner lying wall comprises opening slots, through which the at least one electrical conductor extends from the windings into the groove.

18. An electric motor assembly in accordance with claim 17, wherein steps between the sections of different depth lie at the angular positions of the opening slots.

19. An electric motor assembly in accordance with claim 10, wherein the at least one groove has a radially inner lying wall which in the axial direction has a greater height than a radially outer lying wall of the at least one groove.

20. An electric motor assembly in accordance with claim 10, wherein the at least one groove extends over a limited peripheral section of less than 360°.

* * * * *